United States Patent [19]

Alanis

[11] Patent Number: 5,771,979
[45] Date of Patent: Jun. 30, 1998

[54] BI-DIRECTIONAL MOLDBOARDS SUPPORTS USED IN MOLDBOARD PLOWS TO CARRY OUT CONSERVATION TILLAGE

[75] Inventor: Omar Cantu Alanis, Nuevo Leon, Mexico

[73] Assignee: Industrias John Deere, S.A. DE C.V., Mexico

[21] Appl. No.: 699,919

[22] Filed: Aug. 20, 1996

Related U.S. Application Data

[63] Continuation-in-part of Ser. No. 366,325, Dec. 28, 1994, abandoned.

[51] Int. Cl.⁶ .................................................. A01B 3/40
[52] U.S. Cl. ........................................ 172/219; 172/221
[58] Field of Search ................................. 172/126, 127, 172/130, 131, 204, 210, 212, 213, 215, 219, 225, 271, 310, 311, 314, 427, 666, 695, 772

[56] References Cited

U.S. PATENT DOCUMENTS

| | | | |
|---|---|---|---|
| D. 320,397 | 10/1991 | Gomez | D15/11 |
| 2,764,076 | 9/1956 | Fowler | 97/32 |
| 3,186,496 | 6/1965 | Cox et al. | 172/211 |
| 4,800,963 | 1/1989 | Gomez | 172/219 |
| 4,942,928 | 7/1990 | Gomez | 172/219 |
| 4,984,638 | 1/1991 | Coste | 172/221 |
| 5,000,267 | 3/1991 | Harrell | 172/219 |
| 5,020,603 | 6/1991 | Harrell | 172/219 X |
| 5,024,281 | 6/1991 | Furlough | 172/219 |
| 5,076,368 | 12/1991 | Harrell | 172/219 |
| 5,078,217 | 1/1992 | Harrell | 172/219 |
| 5,135,056 | 8/1992 | Sarton | 172/221 |
| 5,154,239 | 10/1992 | Harrell et al. | 182/269 |
| 5,172,769 | 12/1992 | Lunsford, Jr. | 172/162 |
| 5,199,503 | 4/1993 | Matsepuro et al. | 172/221 |
| 5,267,618 | 12/1993 | Harrell | 172/219 |
| 5,396,961 | 3/1995 | Coste | 172/219 |
| 5,407,015 | 4/1995 | Swords et al. | 172/200 |

FOREIGN PATENT DOCUMENTS

| | | | |
|---|---|---|---|
| D4390 | 8/1989 | Mexico | 15/3 |
| D4391 | 8/1989 | Mexico | 15/3 |
| 2002211 | 2/1982 | United Kingdom . | |

*Primary Examiner*—Randolph A. Reese
*Assistant Examiner*—Robert Pezzuto
*Attorney, Agent, or Firm*—Baker & Botts, L.L.P.

[57] ABSTRACT

In accordance with the present invention, there is provided a tillage conservation plow (100) for plowing the earth and exposing, on the surface of the earth, weeds and past harvest residue. The plow includes a hitch frame (1) and a framework (2) connected to the hitch frame. A support (10) is connected to the framework. The support is operable to allow the earth to pass unturned. A blade (4) is connected to the moldboard support. The support, in combination with the blade, is operable to place the weeds and past harvest residue on the surface of the earth without turning over the soil.

15 Claims, 5 Drawing Sheets

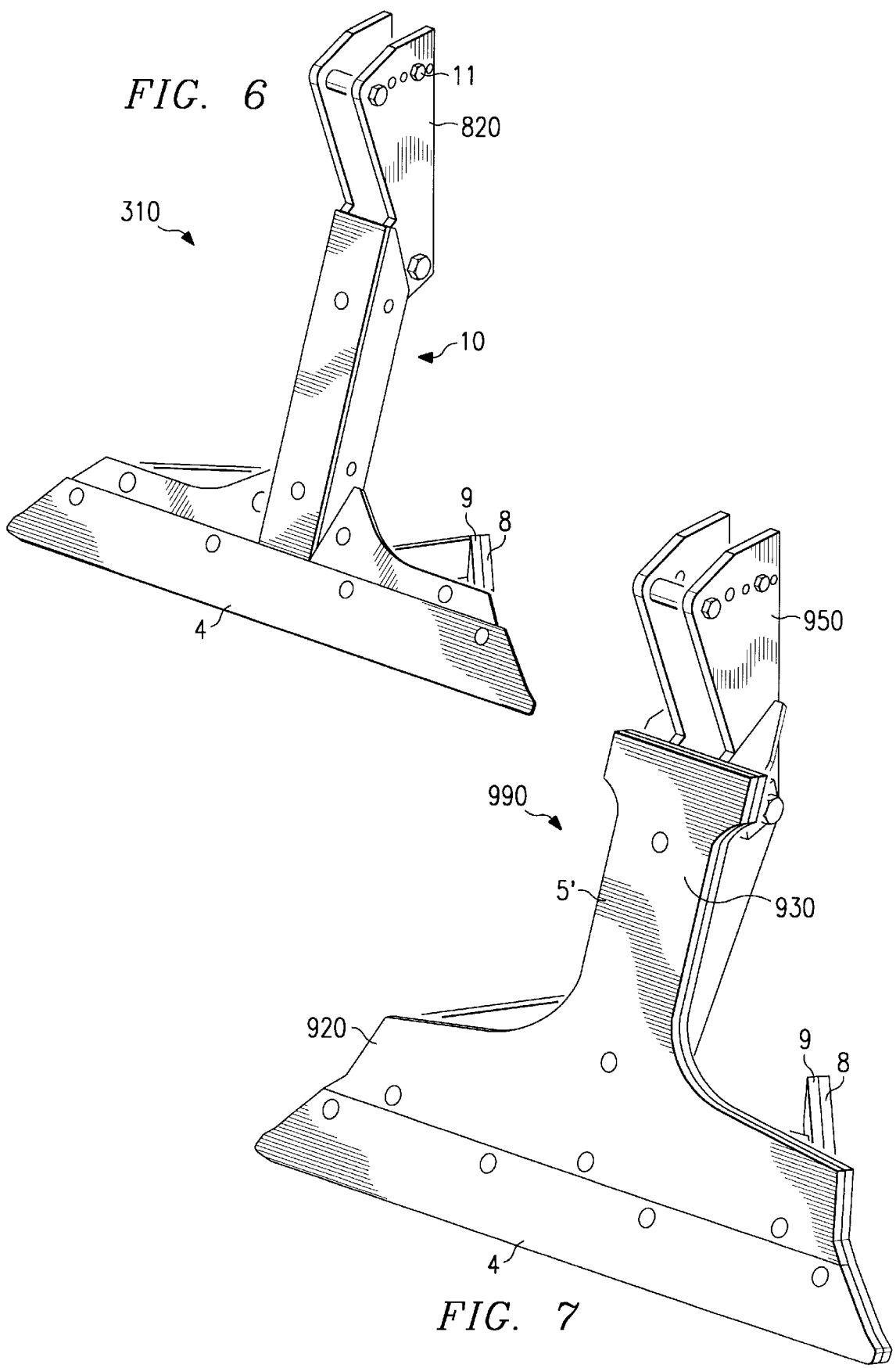

5,771,979

BI-DIRECTIONAL MOLDBOARDS SUPPORTS USED IN MOLDBOARD PLOWS TO CARRY OUT CONSERVATION TILLAGE

CROSS-REFERENCE TO RELATED APPLICATIONS

This application is a continuation-in-part of U.S. Pat. application Ser. No. 08/366,325 entitled "Bi-Directional Blades or Mold Boards To Be use in Tillage Conservation Agricultural Implements," filed Dec. 28, 1994 abandoned, by Omar Cantu Alanis, which claims priority of Mexican Application Serial Number 9406577, entitled "Bi-Directional Blades or Moldboards Used in the Moldboard Ploughs to Carry Out Conservation Tillage, filed Aug. 29, 1994.

TECHNICAL FIELD OF THE INVENTION

This invention is generally related to the field of agricultural implements for working the land and more particularly to plows and plow moldboard supports.

BACKGROUND OF THE INVENTION

Plows are well known for working the land. Plows may include moldboard supports for supporting moldboards or blades for penetrating and working the ground. One method of working the land is known as "conventional tillage." With conventional tillage, the stubble and/or weeds remain completely under the soil, leaving the surface clean or free of residues from the previous harvest. U.S. Pat. No. 4,942,928, entitled Bidirectional Moldboard Plow with Adjustable TiltingMechanism, and U.S. Pat. No. 5,000,267, entitled Reversible Plow, discuss moldboards and plows that may be suitable for conventional tillage.

In contrast to conventional tillage, with "conservation tillage" the weeds and/or stubble remains on the surface to prevent the wind and rain from eroding the fertile and cultivable soil, as well as conserving the accumulated humidity of the soil for longer periods of time. Therefore, it is desirable to have a moldboard support and a plow that leaves the weeds and/or stubble remains on the surface to prevent the wind and rain from eroding the fertile and cultivable soil, as well as conserves the accumulated humidity of the soil for longer periods of time.

SUMMARY OF THE INVENTION

In accordance with the present invention, there is provided a tillage conservation moldboard plow for plowing the earth and exposing, on the surface of the earth, weeds and past harvest residue. The plow includes a hitch frame and a moldboard framework connected to the hitch frame. A moldboard support is connected to the moldboard framework. The moldboard support is operable to allow the earth to pass unturned. A blade is connected to the moldboard support. The moldboard support, in combination with the blade, is operable to place the weeds and past harvest residue on the surface of the earth without turning over the soil.

According to another aspect of the invention, a tillage conservation moldboard assembly for use with a plow for plowing soil is provided. The moldboard assembly includes a tillage conservation bi-directional blade having an edge and a moldboard support for connection to a plow. The support includes a narrow center portion operable to allow the soil to pass unturned and a blade support having a rear surface for connecting the blade to the moldboard support. A detachable wear section operable to reduce wear is included on the center portion. A honed cutting portion on the edge is provided for penetrating the earth and providing a flat cut to place the weeds and past harvest residue on the surface of the earth. A stabilizing section having a regulating flange rigidly is connected to the rear surface of the blade support. The stabilizing section is operable to stabilize the plow. The moldboard support, in combination with the tillage conservation bi-direction blade, is operable to place weeds and past harvest residue on the surface of the earth without turning over the soil.

The present invention provides various technical advantages. For example, one technical advantage is that the invention provides moldboards supports and a plow that turn over a minimum proportion of earth and leave behind most weeds or residues of the previous harvest or stubble on the surface, and destroying and damaging the roots. It breaks up the earth, aerating it and, on loosening the earth, leaves it prepared in such a way that the soil retains the water in an uniform manner.

BRIEF DESCRIPTION OF THE DRAWINGS

For a more complete understanding of the invention and the advantages thereof, reference is now made to the following description taken in conjunction with the accompanying drawings, wherein like reference numerals represent like parts, in which:

FIG. 6 is an isometric sketch of a innovative bidirectional support utilizing a flat wearing away section, showing additional features.

FIG. 7 is an isometric sketch of a innovative bidirectional support after attachment of a curved wearing away section.

DETAILED DESCRIPTION OF THE INVENTION

U.S. Pat. No. 4,942,928, entitled Bidirectional Moldboard Plow with Adjustable Tilting Mechanism, and U.S. Pat. No. 5,000,267, entitled Reversible Plow, are hereby incorporated by reference for all purposes.

Figure 1:
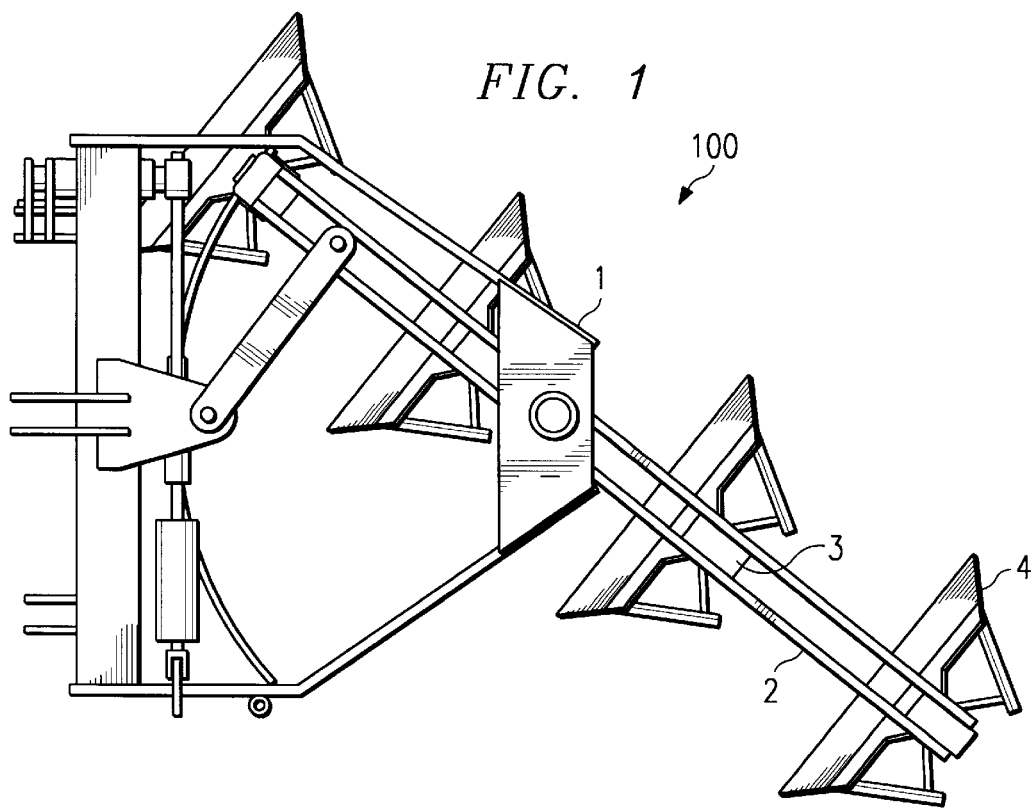
FIG. 1 is a plan view of a plow with four moldboards in which is shown the plow with one sole set of bidirectional moldboards supports.
Figure 2:
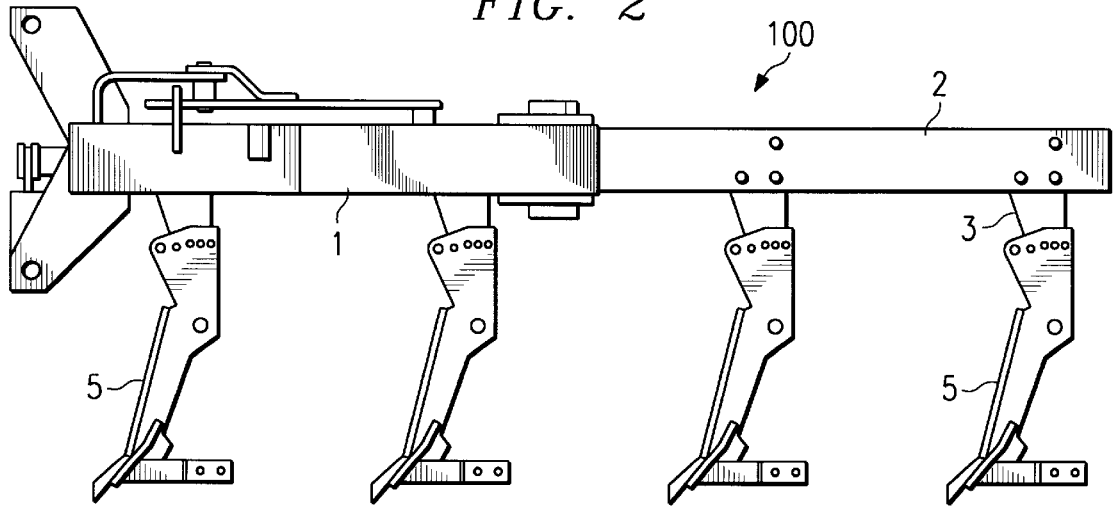
FIG. 2 is a side view of the bidirectional blade plow illustrated in FIG. 1, and in which other details are shown, the innovative moldboards supports and bidirectional blades, as well as the supports which reach the moldboard framework and the main or hitch frame.

The preferred embodiments of the present invention and its advantages are best understood by referring to FIGS. 1–9 of the drawings, like numerals being used for like and corresponding parts of the various drawings. Referring to FIG. 1, a moldboard plough 100 according to the invention is shown. Plows suitable for use with at least one aspect of the invention include pick-up plows, semi-pick-up plows, pulled plows, in or out of the furrow. Moldboard plough 100 includes a hitch frame 1. The moldboard plough 100 further includes a moldboard framework 2 joined to the hitch frame 1. The framework can be rotated my means of a reversion mechanism. Supports or beams 3 are attached to the moldboard framework 2. As illustrated better in FIG. 2, beams 3 are connected to moldboard supports 10, also shown in FIGS. 3–9.

To the beam 3 is assembled the bidirectional moldboards support 10, which connects the bidirectional blades or moldboards 4 to the moldboard framework 2. The moldboards supports 10 may be unidirectional or bidirectional, the first may be coupled to fixed plows and the second to reversible plows. The moldboards support 10 for plowing can be manufactured for different cutting widths, speeds and types of land, allowing the maximum possible use of the tractors performance; as the slenderness of the support means it is light to operate and to transport. During the plowing, a pointed section 802 of the inside cutting edge (FIG. 8), makes the first contact with the soil provoking the suction that makes blade 4 penetrate the ground. The penetrating effect of the blades 4 is achieved by suction on being pulled by the tractor. The blades 4 do not have limitations with regards to cutting width and do not leave soil unturned, as their cut is flat. On occasions the cut of the first blade partly overlaps the second, the same happening with the other blades, leaving the soil in smaller fragments because of this action.

In order to reduce the risk of breakages or cracks in the moldboards support 10 or in the blades 4, a release mechanism can be provided which allows the plough to pass over the obstacles and which can be automatically or manually reinstalled (the plow and/or the support) in order to lower it once again into the ground. Notwithstanding the fact that there could be failures in the moldboards support or blades due to the stresses which they encounter when the moldboards support is forced to unhook itself during continuous use of the blades, these and the parts of the support subject to wear will become worn and should be replaced.

Figure 3:
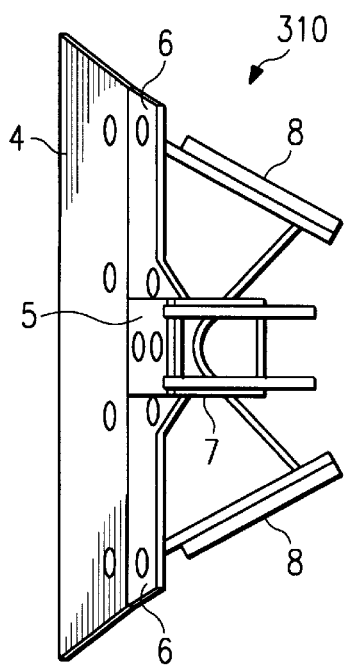
FIG. 3 is a plan view of the innovative bidirectional moldboards support which shows the sections and components.
Figure 4:
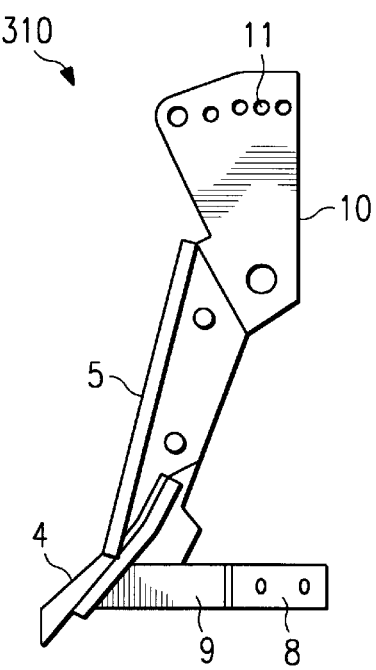
FIG. 4 is a side view of the innovative bidirectional moldboards support illustrated in FIG. 3 and which shows more details of the sections and components.
Figure 5:
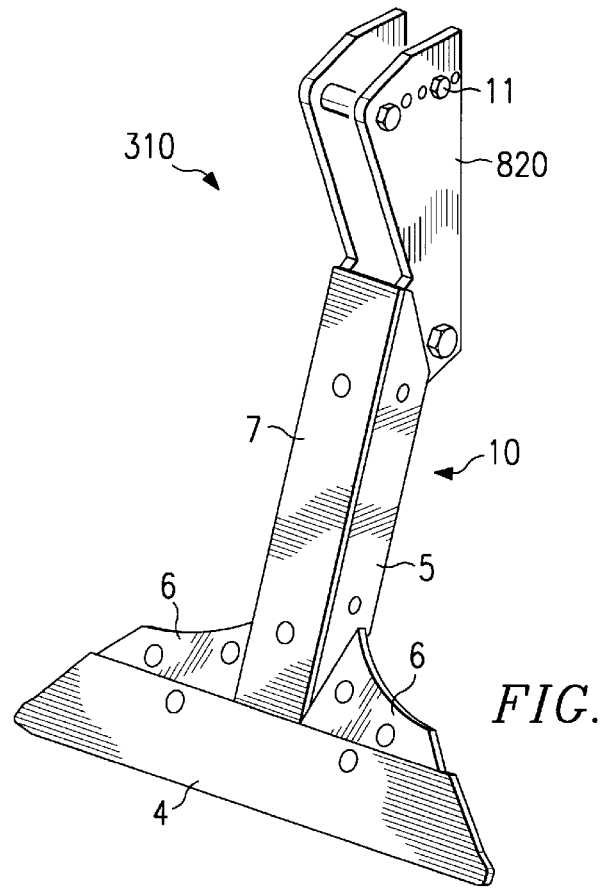
FIG. 5 is an isometric sketch of a innovative bidirectional support utilizing a flat wearing away section.
Figure 8:
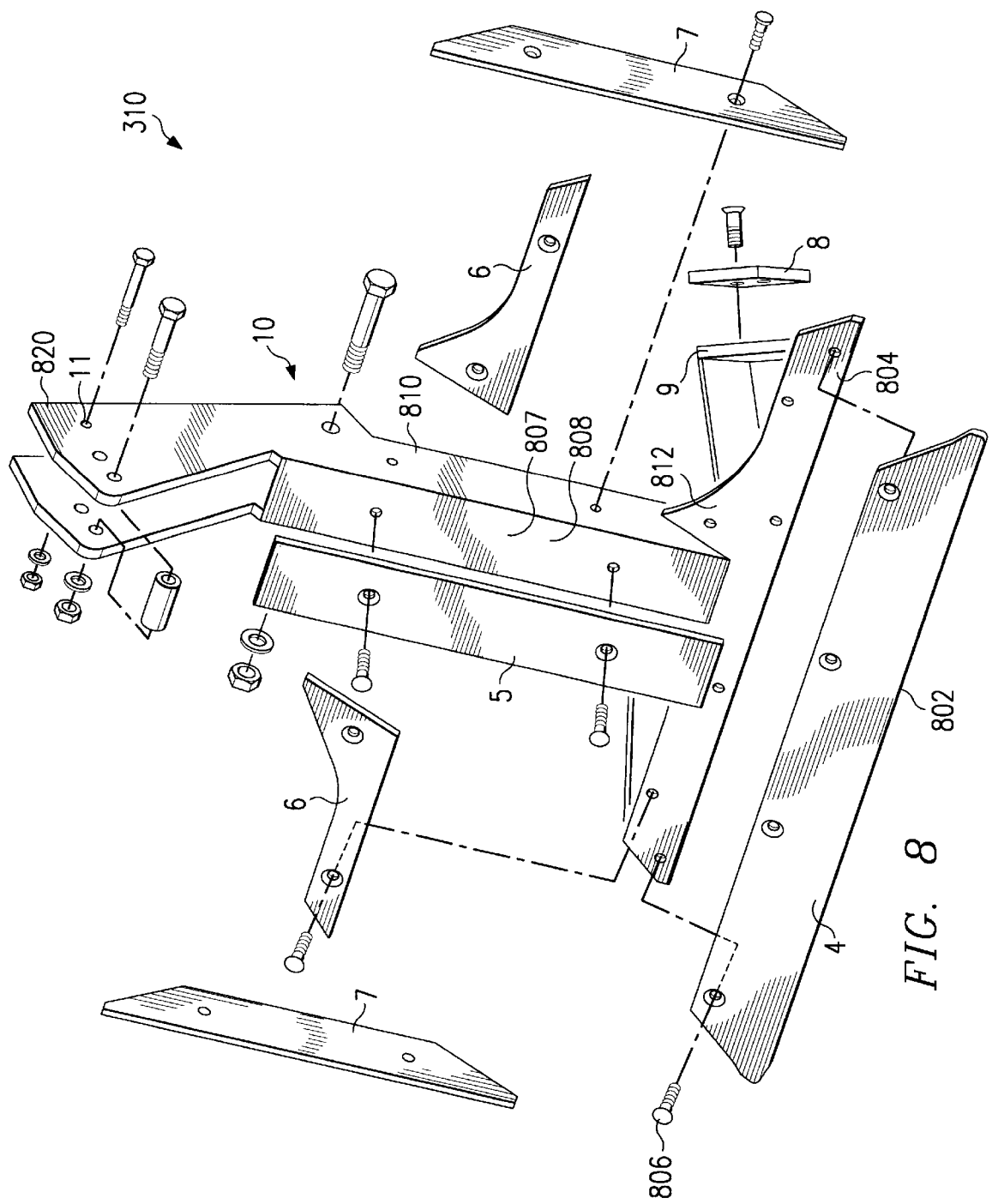
FIG. 8 is an exploded view with portions broken away of a bidirectional support, showing attachment of a flat wearing away section.

Moldboard support 10 is part of moldboard supports assembly 310, which is illustrated more clearly in FIGS. 3, 5, and 8. Additionally, moldboard support 10' is also curved. Moldboard support assembly 310 includes a detachable bidirectional blade or moldboard portion 4 for penetrating the ground. Detachable blade or moldboard 4 may have a pointed section 802 for first contacting the ground. For engagement with moldboard or blade 4 is a blade support 804 of moldboard support 10. Moldboard or blade 4 may be attached to blade support 804 through screws 806 or other techniques well known in the art. The blades 4 may be the same as or similar to those used on conventional moldboard plows with the bottom and front edges sharpened.

Extending from base portion 804 are a pair of welded lateral stabilizing sections 9 located at the ends of the innovative bidirectional moldboards support 10 in order to compensate for lateral stresses at each end. Each stabilizing section 9 is supported by a regulating flange 8, which in the case of the last moldboard or moldboards support, may be of a greater size. The stabilizing sections 9 and the regulating flanges 8 stabilize the plough and keep it straight, carrying out the same function as the guiding wheel used in the disk plows.

Figure 9:
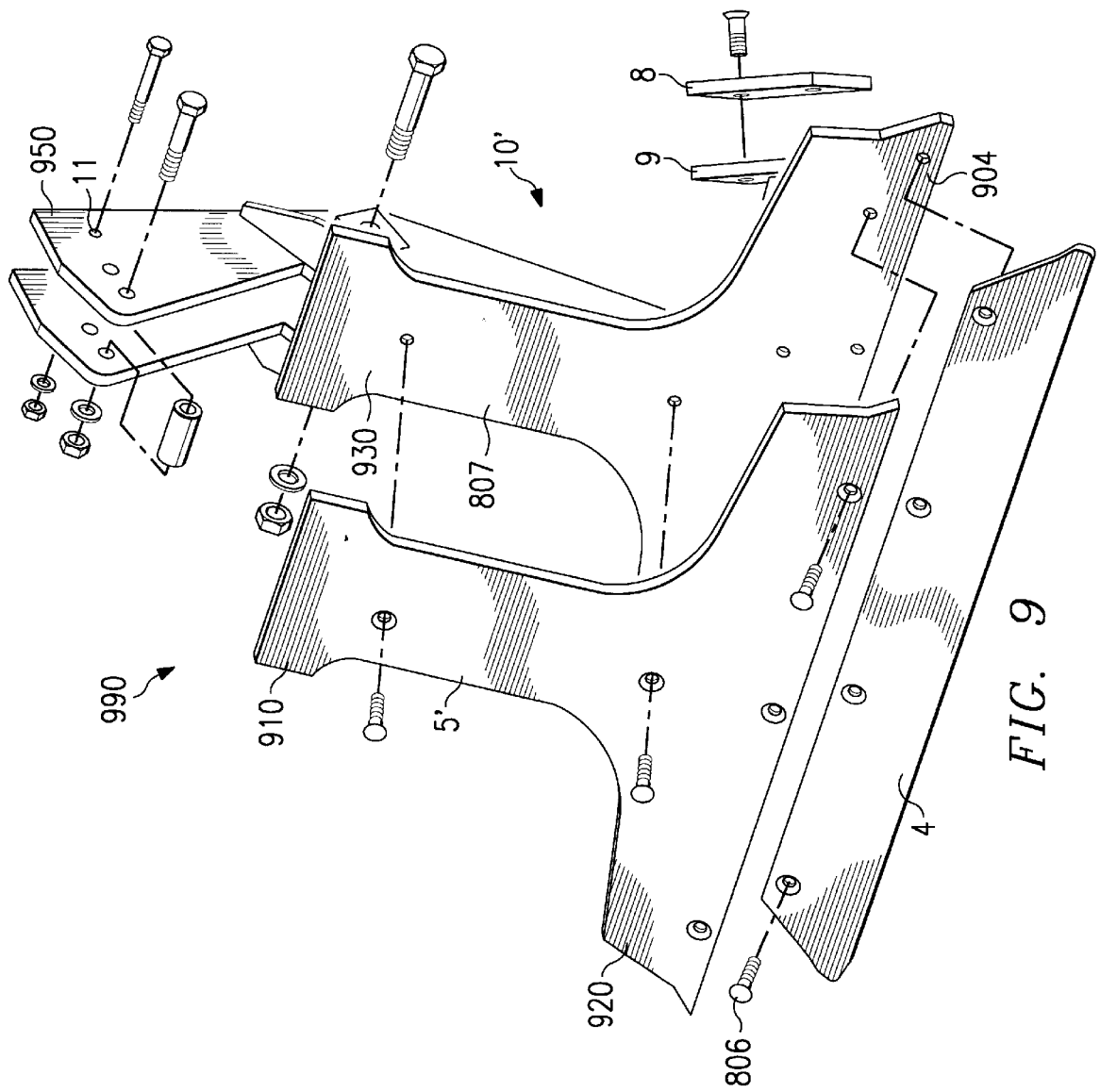
FIG. 9 is an exploded view with portions broken away of a bidirectional support, showing attachment of a curved wearing away section.

The moldboard support 10 has a narrow center section 807, a front face 808, and side faces 810. A plurality of detachable sections that are subject to wear may be attached to or near moldboard 10. For example, flat wear section 5 attaches to front face 808 of moldboard support 10. Flat wear section 5 may be replaced after experiencing excessive wear. Front wear sections 6 may be attached to top portion 812 of base portion 804 on either side of moldboard support 10. Side wearing away sections 7 may be attached to side faces 810 of moldboard support 10. In an alternative embodiment, shown in FIG. 9, wear section 5' of moldboard assembly 990 is curved and includes a wider base section 920 and a narrow top section 910, which conform to the shape of the center portion 940 of bidirectional moldboard support 10'. Narrow center portion 807 of moldboard support 10' has a tall, narrow top portion 930 and a wider lower section 940. Moldboard support 10' may be curved as shown in FIGS. 7 and 9.

Due to the tall and narrow shape of narrow center portions 807 and 940 of moldboard supports 10 and 10', the moldboard supports allow the soil to pass by its sides without turn over the soil. The moldboards and moldboard supports only move the soil, loosening it, grinding it, and destroying the roots of existing plants without exposing the pests on the surface. With this type of moldboard and moldboard support, the weeds will remain standing up but their roots will be damaged, causing the plant to die. This contrasts with conventional supports, which have a curved wide shape. Due to that shape, conventional supports turn the soil over and leave the weeds or stubble covered by the soil and exposing pests on the surface.

Upper portion 820 of bidirectional moldboard support 10 may be formed with a plurality of holes or slots 11 for varying the facing angle of the blade 4, which in turn allows the modification of the suction of the moldboards or plough, more or less according to the different types of soil or operating criterion. Similarly, upper portion 950 of bidirectional moldboard support 10' may be formed with a plurality of holes or slots 11 for varying the facing angle of blade 4.

With reference to FIGS. 1–8, and particularly FIGS. 5 and 8, the operation of moldboard support 10 is described. As plow 100 progresses along the area to be plowed pointed section 802 of the inside cutting edge of blade 4 (FIG. 8), makes the first contact with the soil provoking the suction that makes blade 4 penetrate the ground. As the blade penetrates the ground, the soil will be loosened and grinded, but not turned over. Rather, the soil will pass around narrow center portion 807 due to the narrow configuration of the moldboard support 10 without turning over. This operation contrasts with the use of conventional moldboard supports in which the soil is turned over. The operation of moldboard support 10' is substantially similar to moldboard support 10. As blade 4 penetrates the ground, the soil is directed around center portion 807, loosing and grinding the soil but without turning it over.

On moving the moldboards supports through the soil, the working blades which are connected to the innovative moldboards supports will penetrate the earth and cut it up, loosening the earth to the desired depth or the depth allowed by the combination of tractor and implement, or the type or characteristic of the agricultural soil where the implement is used. This type of plough with innovative moldboards supports, will turn over a minimum proportion of earth and leave behind most weeds or residues of the previous harvest or stubble on the surface, destroying and damaging the roots; it will break up the earth, aerating it and, on loosening the earth, leave it prepared in such a way that the soil retains the water in an uniform manner. This way of working the land, by leaving the weed or stubble on the surface, will prevent the wind and rain from eroding the fertile and cultivatable land, as well as conserving the accumulated humidity for a longer period of time, this being called conservation tillage. The control of weeds and pests after the sowing will be carried out by other means. Although the present invention has been described in detail, it should be understood that various changes, substitutions, and alterations readily ascertainable by one of ordinary skill in the art can be made herein without departing from the spirit and scope of the present invention as defined by the follow claims.

What is claimed is:

1. A tillage conservation plow for plowing soil and exposing, on the surface of the earth, weeds and past harvest residue comprising:
   a hitch frame;
   a framework connected to the hitch frame;
   a reversion mechanism for rotating the hitch frame;
   a tillage conservation bi-directional blade having an edge;
   a support configured to pass the soil unturned, the support comprising:
      an upper portion coupled to the framework, the upper portion having a plurality of holes;
      a narrow center portion coupled to the upper portion, the narrow center portion having a minimum width sufficient to allow the soil to pass by the support unturned;
      a detachable wear section connected to the narrow center portion for reducing wear on the narrow center portion, the detachable wear section having a minimum width sufficient to allow the soil to pass by the support unturned; and
      a blade support section for connecting the support to the blade, the blade support having a rear surface;
   a honed cutting portion on the edge for penetrating the earth and providing a flat cut to place the weeds and past harvest residue on the surface of the earth;
   a stabilizing section having a regulating flange rigidly connected to the rear surface of the blade support, the stabilizing section operable to stabilize the plow; and
   wherein the support in combination with the tillage conservation bi-directional blade is operable to place the weeds and past harvest residue on the surface of the earth without turning over the soil.

2. The tillage conservation plow of claim 1 wherein the detachable wear section is curved to conform to the curvature of the narrow center portion.

3. The tillage conservation plow of claim 1 wherein the detachable wear section is flat.

4. The tillage conservation plow of claim 1 wherein the narrow center portion of the support has a maximum width less than ½ the width of the blade.

5. The tillage conservation plow of claim 1 wherein the narrow center portion has a minimum width of less than ½ the width of the blade.

6. The tillage conservation plow of claim 1 wherein the narrow center portion of the support has a maximum width less than ¼ the width of the blade.

7. The tillage conservation plow of claim 1 wherein the narrow center portion has a minimum width of less than ¼ the width of the blade.

8. The tillage conservation plow of claim 1 wherein the maximum width of the narrow center portion is less than ⅙ of the width of the blade.

9. The tillage conservation plow of claim 1 wherein the narrow center portion comprises a substantially rectangular section and wherein the substantially rectangular section has a length and a width, the length of the substantially rectangular section at least 3 times the width of the substantially rectangular section.

10. A tillage conservation assembly for use with a plow for plowing soil and exposing, on the surface of the earth, weeds and past harvest residue, the assembly comprising:
    a tillage conservation bi-directional blade having an edge;
    a support configured to pass the soil unturned and for connection to the plow, the support comprising:
       a narrow c enter portion having a minimum width sufficient to allow soil to pass by the support unturned; and
       a blade support having a rear surface for connecting the blade to the support;
    a detachable wear section for connection to the narrow center portion, the detachable wear section operable to reduce wear on the center portion;
    a honed cutting portion on the edge for penetrating the earth and providing a flat cut to place the weeds and past harvest residue on the surface of the earth;
    a stabilizing section having a regulating flange rigidly connected to the rear surface of the blade support, the stabilizing section operable to stabilize the plow; and
    wherein the support in combination with the tillage conservation bi-directional blade is operable to place weeds and past harvest residue on the surface of the earth without turning over the soil.

11. The tillage conservation assembly of claim 10 wherein the blade has an orientation with respect to the earth and wherein the support further comprising a top portion formed with a plurality of holes for varying the orientation of the blade with respect to the earth.

12. The tillage conservation plow of claim 10 wherein the narrow center portion of the support has a maximum width less than ¼ the width of the blade.

13. The tillage conservation plow of claim 10 wherein the narrow center portion has a minimum width of less than ¼ the width of the blade.

14. The tillage conservation plow of claim 10 wherein the maximum width of the narrow center portion is less than ⅙ of the width of the blade.

15. The tillage conservation plow of claim 10 wherein the narrow center portion comprises a substantially rectangular section and wherein the substantially rectangular section has a length and a width, the length of the substantially rectangular section at least 3 times the width of the substantially rectangular section.

* * * * *